United States Patent
Vaverka

(10) Patent No.: US 10,569,946 B2
(45) Date of Patent: Feb. 25, 2020

(54) STRETCHABLE ZIP TIE

(71) Applicant: Robert Vaverka, Riedenthal (AT)

(72) Inventor: Robert Vaverka, Riedenthal (AT)

( * ) Notice: Subject to any disclaimer, the term of this patent is extended or adjusted under 35 U.S.C. 154(b) by 0 days.

(21) Appl. No.: 16/198,852

(22) Filed: Nov. 22, 2018

(65) Prior Publication Data

US 2019/0210779 A1   Jul. 11, 2019

(30) Foreign Application Priority Data

Jan. 10, 2018   (AT) ................. A50008/2018

(51) Int. Cl.
*B65D 63/10* (2006.01)
*F16L 3/233* (2006.01)

(52) U.S. Cl.
CPC .... *B65D 63/1063* (2013.01); *B65D 2563/106* (2013.01); *B65D 2563/107* (2013.01); *F16L 3/2332* (2013.01); *Y10T 24/141* (2015.01); *Y10T 24/1498* (2015.01); *Y10T 24/153* (2015.01)

(58) Field of Classification Search
CPC . Y10T 24/141; Y10T 24/1498; Y10T 24/153; Y10T 24/1406; Y10T 24/4782; Y10T 24/4736; Y10T 24/4028; Y10T 24/4037; Y10T 24/4058; Y10T 24/4065; B65D 2563/106; B65D 2563/107; B65D 63/1063; F16L 3/233; F16L 3/2332
See application file for complete search history.

(56) References Cited

U.S. PATENT DOCUMENTS

| | | | |
|---|---|---|---|
| 3,766,608 A * | 10/1973 | Fay | B65D 63/1063 24/16 PB |
| 4,003,106 A | 1/1977 | Schumacher et al. | |
| 4,275,484 A | 6/1981 | Irio et al. | |
| 4,573,242 A * | 3/1986 | Lankton | B65D 63/1081 24/16 PB |
| 4,866,816 A | 9/1989 | Caveney | |
| 4,958,414 A * | 9/1990 | Benoit | B65D 63/1063 24/16 PB |
| 4,987,651 A | 1/1991 | Oetiker | |
| 5,088,159 A * | 2/1992 | Lafleur | B65D 63/1018 24/16 PB |
| 5,819,375 A * | 10/1998 | Kastner | F16L 3/2332 24/16 PB |
| 6,634,063 B2 | 10/2003 | Joseph | |
| 7,866,005 B2 | 1/2011 | Vermeer et al. | |

FOREIGN PATENT DOCUMENTS

| | | |
|---|---|---|
| AT | 411052 B | 9/2003 |
| AU | 516395 B2 | 6/1981 |
| DE | 19520406 A1 | 12/1996 |
| JP | S4713112 Y1 | 5/1972 |

* cited by examiner

*Primary Examiner* — Robert Sandy
*Assistant Examiner* — Michael S Lee
(74) *Attorney, Agent, or Firm* — Smartpat PLC

(57) ABSTRACT

An improved zip tie includes a strap with a plurality of spaced holes formed therein. A head is supported at one end of the strap. The head has an entry opening for insertably accomodating the other end of the strap. A guide channel is formed within the head and extends between the entry opening and an opposite exit opening. A tongue is arranged within the guide channel and pivotally supported on a base at the entry opening. The tongue is pivotable between a locked position and an open position. A securing groove receives the tongue in the locked position. The securing groove is formed in the guide channel opposite the base proximal to the exit opening.

5 Claims, 2 Drawing Sheets

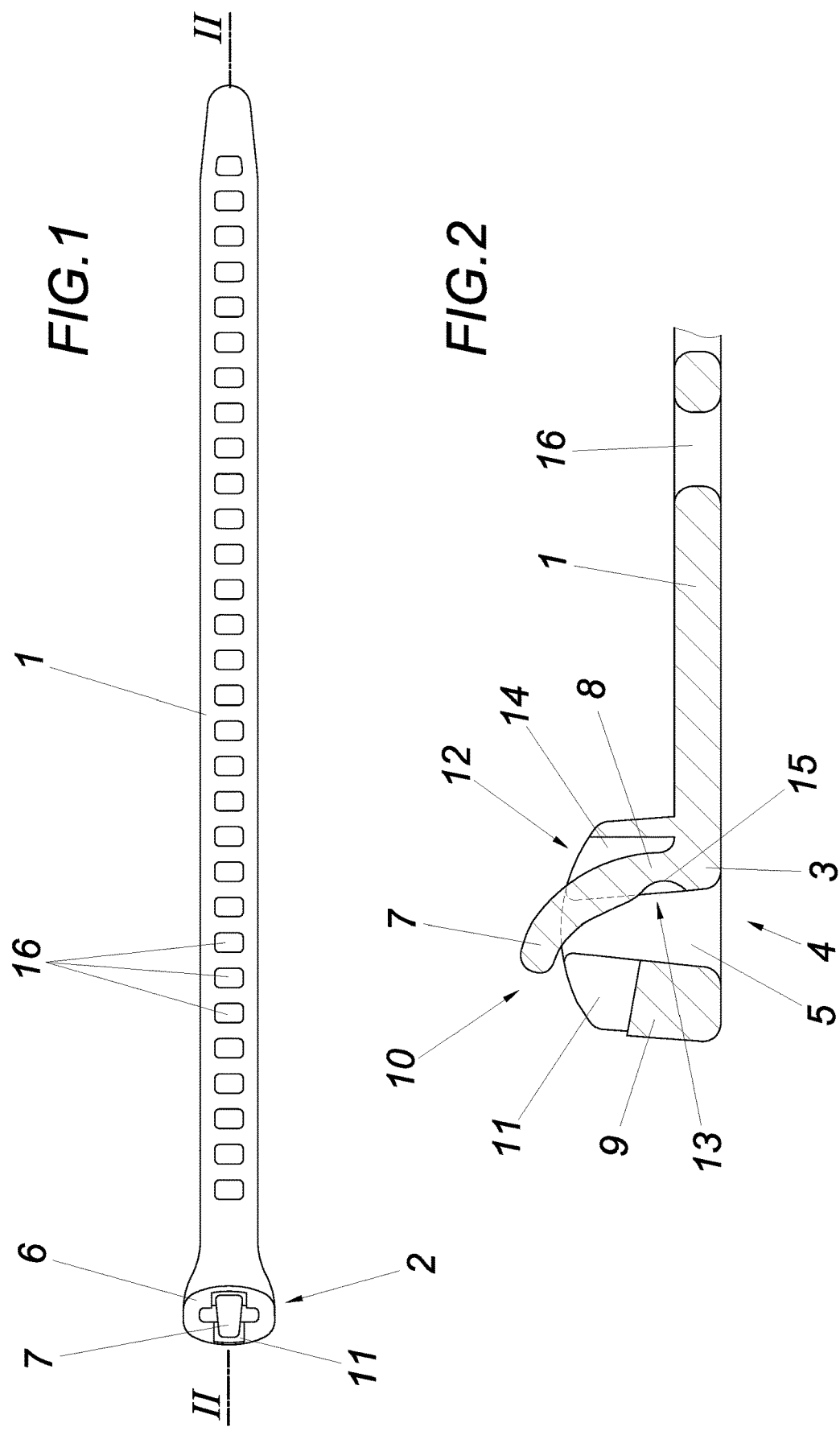

STRETCHABLE ZIP TIE

TECHNICAL FIELD

The disclosure relates to a stretchable zip tie for fastening objects.

BACKGROUND

Austrian Patent AT 411052 teaches fasteners which can be made integrally from an elastically deformable material and which are suitable for connecting objects under pretension. Due to high forces that act on these fasteners as a result of the prestressing their elastic head can deform and a latching tongue therein can be bent out of a latching hole in the strap which it engages. In some instances, the tongue can even break off due to force peaks that can occur. In that case, the strap can slide out of the head and the fastener fails, releasing an enclosed object. This problem arises in particular when transverse forces act on the strap or when the tongue is deformed or damaged by external influences.

Also, the locking tongues of known fasteners can easily be overstretched when they are released from the latching holes, whereby the resetting effect of the latching tongues is lost with frequent use and the latching tongues are damaged. In the worst case, a latching tongue can break off and render the fastener completely useless.

The present disclosure is based on the object to provide a stretchable fastener that securely holds objects under pretension, in particular where shear forces can act on a strap of the fastener.

SUMMARY

An improved zip tie fastener solves the problems associated with the known fasteners by providing a strap with a plurality of spaced holes formed therein. A head is supported at one end of the strap. The head has an entry opening for insertably accomodating the other end of the strap. A guide channel is formed within the head and extends between the entry opening and an opposite exit opening. A tongue that acts as a latch member is arranged within the guide channel and pivotally supported on a base at the entry opening. The tongue is pivotable between a locked position and an open position. A securing groove receives the tongue in the locked position. The securing groove is formed in the guide channel opposite the base proximal to the exit opening.

The strap is guided within and secured against lateral motion by the guide channel which extends from the entry opening to the opposite exit opening. The cross section of the guide channel corresponds to the cross section of the strap. The guide channel may be formed by one or more side walls which abut, at least in sections, the guided strap therein. Despite the use of a stretchable or elastic material, this results in a very secure locking mechanism. The latching tongue extends in the locked position from the base through a hole in the strap across the guide channel. There is engages the securing groove in the wall opposite the base. This prevents bending of the latching tongue transversely to its longitudinal axis. When the strap is inserted into the guide channel to secure an object the tongue is bent back into an open position. The tongue partially engages the holes of the strap while the strap moves towards the exit opening of the guide channel while being tightened. The tongue then completely engages and reaches through a hole in the strap as the strap rebounds due to its elasticity. Due to the pretension of the strap the tongue is pulled into the securing groove which is formed in a wall of the guide channel opposite the base. The tongue can only be released from the securing groove by pulling the free end of the strap in insertion direction, thereby lifting the tongue out of the securing groove and pivoting it back into its open position. Of course, this only works if the strap is made of a stretchable material.

A particularly advantageous mechanical behavior of the zip tie is achieved when the head and the adjoining strap are integrally formed from a material which is both energy-elastic and entropic-elastic. Such a material provides, on the one hand, sufficient bending elasticity and, on the other hand, the required stretchability, while at the same time being sufficiently rigid. Such a material may be, for example, a thermoplastic elastomer which allows easy processing by injection molding and provides good recyclability.

In order to enable a flush arrangement of the guide channel wall with the strap at the latching tongue a recess may extend longitudinally in the wall of the guide channel above the base. The recess is adapted to receive the tongue in the open position. Consequently, the tongue, when it its open position, is not located in the guide channel but in the adjacent recess. This improves the guide channel's ability to guide the strap while also enabling a small size of the head. Also, the set-back recess forms a stop for the tongue, which prevents the tongue from being overstretched while in its open position. Otherwise, overstretching might damage the tongue despite its stretchable design.

The tongue may have a thinned portion at an end at which the tongue is connected to the base. This thinned portion on the one hand forms a defined pivot axis for the tongue. On the other hand, the thinned portion may prevent material deformation of the tongue in the area of base when pivoting. The thinned portion may advantageously extend across the tongue at its transition to the base such that a film hinge is formed. The film hinge has a pivot axis around which the tongue is pivotable out of the locked position into the open position and back again. The thinned portion may be implemented as a semicircular back taper facing the guide channel. This is advantageous because portions of the tongue and the base which are adjacent to the thinned portion come to rest on top of each other when the tongue is in the locked position, which provides a particularly stable, positive connection.

The tongue can be tapered towards its open end which faces away from the base to avoid breakage of the tongue, in particular near the base, when the zip tie is exposed to strong forces. A force acting on the zip tie then causes the tapered portion of the tongue to bend against the insertion direction of the guide channel. If the tongue is convexly pre-bent in the insertion direction this causes the front of the tongue to securely rest in the securing groove. At the same time, damage to the joint at the base, in particular when using a film hinge, is prevented.

A secure engagement of the tongue in the holes of the strap and easy accessibility of the tongue for releasing the zip tie is provided when the base is arranged on the side of the guide channel which faces the strap.

BRIEF DESCRIPTION OF THE DRAWINGS

The drawings show an example of an improved zip tie.

FIG. 1 is a schematic top view of a zip tie.

FIG. 2 shows an enlarged cross section along line II-II of FIG. 1.

DETAILED DESCRIPTION

Figure 3:
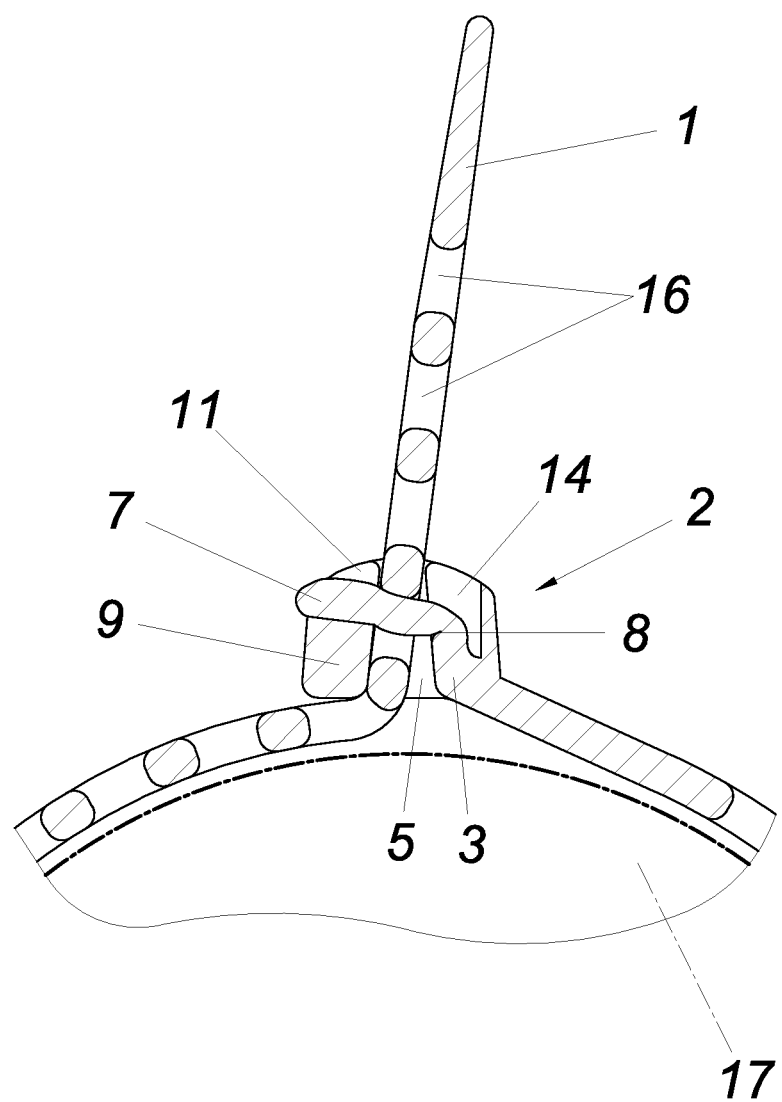
FIG. 3 is a partial sectional view of the zip tie in the locked position.

An improved zip tie comprises a strap 1 and a head 2 adjoining the strap 1. The head 2 is integrally formed with the strap 1. The head 2 has a base 3 next to an entry opening 4 of a guide channel 5. The guide channel 5 is bounded by a peripheral wall 6. At the base 3, a latching tongue 7 is pivotally hinged about a film hinge 8. The latching tongue 7 can be displaced back and forth between an opening position shown in FIG. 2 and a latching position shown in FIG. 3. A securing groove 11 is formed in a wall 9 of the guide channel 5 which is opposite the base 3. The securing groove 11 extends to an exit opening 10 of the guide channel 5 which is opposite the entry opening 4. The securing groove 11 receives the latching tongue 7 when in the locked position as shown in FIG. 3.

The wall 12 of the guide channel 5 above the base 3 can be formed to include a recess 14 which extends in the longitudinal direction of the guide channel 5. The recess 14 may be recessed relative to an inner wall 13 of the guide channel 5. The recess 14 may receive the tongue 7 when in the open position. Also, the tongue 7 may include a thinned portion 15 at an end attached to the base 3. A film hinge 8 is formed in the illustrated embodiment.

In order to avoid breakage of the tongue 7 under strong loads, the tongue 7 may taper towards its free end facing away from the base 3, so that a bending of the tongue 7, as shown in FIG. 3, is facilitated.

To use the improved zip tie, the strap 1 with its holes 16 is inserted through the entry opening 4 of the head 2 into the guide channel 5. During tightening, the tongue 7 is bent back towards the inner wall 13 of the guide channel 5 into the recess 14 of the inner wall 12. The strap 1 can so glide within the guide channel 5. The wall 6 of the head 2 encloses the strap 1 and secures the lateral position of the strap in a plane which is perpendicular to the longitudinal extension of the strap. During insertion, the tongue 7 partially penetrates the holes 16 of the strap 1 in the guide channel 5. The pivoting range of the tongue 7 is limited to the rear by the recess 14 to avoid overstretching of the tongue 7.

Once the zip tie has been sufficiently tightened and encloses the object to be fastened under tension the strap 1 may be released. As shown in FIG. 3, once the strap 1 is released, the tongue 7 engages and penetrates a hole 16 of the strap 1, extending across the guide channel 5 into the securing groove 11. The size of the securing groove 11 and the tongue 7 can be coordinated so that they are flush with each other, thereby protecting the tongue against external forces.

The zip tie can be released by pulling the strap 1 so that the tongue 7 is released from the securing groove 11 and is bent back from the respective hole 16 into the open position.

What is claimed is:

1. A stretchable zip tie, comprising:
   a strap having a plurality of spaced holes formed therein;
   a head supported at one end of the strap having an entry opening for insertably accomodating the other end of the strap;
   a guide channel formed within the head extending between the entry opening and an opposite exit opening;
   a tongue arranged within the guide channel and pivotally supported on a base at the entry opening, the tongue being pivotable between a locked position and an open position; and
   a securing groove which receives the tongue in the locked position, the securing groove being formed in a wall of the guide channel opposite the base,
   wherein the head and the adjoining strap are integrally formed from a material which is both energy-elastic and entropic-elastic.

2. The stretchable zip tie according to claim 1, wherein a recess extends longitudinally in a wall of the guide channel above the base, the recess being adapted to receive the tongue in the open position.

3. The stretchable zip tie according to claim 1, wherein the tongue has a thinned portion at an end at which the tongue is connected to the base.

4. The stretchable zip tie according to claim 1, wherein the tongue tapers towards an end opposite the base.

5. The stretchable zip tie according to claim 1, wherein the base is arranged on a side of the guide channel which adjoins the strap.

* * * * *